US010801122B2

(12) United States Patent
Cotinot et al.

(10) Patent No.: US 10,801,122 B2
(45) Date of Patent: Oct. 13, 2020

(54) PROTECTIVE EDGE FOR A BLADE AND METHOD OF MANUFACTURING SAID EDGE

(71) Applicant: SAFRAN AIRCRAFT ENGINES, Paris (FR)

(72) Inventors: Jérémie Christian André Cotinot, Moissy-Cramayel (FR); Alain Viola, Ernolsheim/Bruche (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 692 days.

(21) Appl. No.: 15/121,302

(22) PCT Filed: Feb. 24, 2015

(86) PCT No.: PCT/FR2015/050439
§ 371 (c)(1),
(2) Date: Aug. 24, 2016

(87) PCT Pub. No.: WO2015/128575
PCT Pub. Date: Sep. 3, 2015

(65) Prior Publication Data
US 2017/0016134 A1 Jan. 19, 2017

(30) Foreign Application Priority Data

Feb. 25, 2014 (FR) ...................... 14 51482

(51) Int. Cl.
*C25D 11/02* (2006.01)
*B64C 11/20* (2006.01)
(Continued)

(52) U.S. Cl.
CPC .......... *C25D 11/026* (2013.01); *B64C 11/205* (2013.01); *C25D 11/024* (2013.01);
(Continued)

(58) Field of Classification Search
CPC ..... C25D 11/026; C25D 11/024; C25D 11/26; C25D 11/18; F04D 29/325; F04D 29/542;
(Continued)

(56) References Cited

U.S. PATENT DOCUMENTS 8,449,784 B2    5/2013  Parkos et al.
8,858,182 B2*  10/2014  Schwarz ................. F01D 5/28
                                                          416/224
(Continued)

FOREIGN PATENT DOCUMENTS

FR    2 877 018 A1    4/2006
WO    WO 2013/021141    2/2013

OTHER PUBLICATIONS

Weiyi Mu et al., "Wear and Corrosion Resistant Coating Formed on Titanium Alloy by Micro-Arc Oxidation", Northwest institute for Nonferrous Metal Research, vol. 27, No. 6, Dec. 2010 (5 pages).
(Continued)

*Primary Examiner* — Kenneth Bomberg
*Assistant Examiner* — Adam W Brown
(74) *Attorney, Agent, or Firm* — Bookoff McAndrews, PLLC

(57) ABSTRACT

A method of manufacturing a protective edge for a blade, wherein a protective edge (30) made of an anodizable metal is provided, and that protective edge (30) undergoes a micro-arc oxidation electrolytic treatment. Protective edge (30) manufactured using said method.

20 Claims, 3 Drawing Sheets

(51) Int. Cl.
  C25D 11/26 (2006.01)
  C25D 11/18 (2006.01)
  F04D 29/32 (2006.01)
  F01D 5/28 (2006.01)
  F01D 5/14 (2006.01)
  F04D 29/54 (2006.01)

(52) U.S. Cl.
  CPC .............. C25D 11/18 (2013.01); C25D 11/26 (2013.01); F01D 5/147 (2013.01); F01D 5/288 (2013.01); F04D 29/324 (2013.01); F04D 29/325 (2013.01); F04D 29/542 (2013.01); F05D 2220/36 (2013.01); F05D 2240/303 (2013.01); Y02T 50/672 (2013.01); Y02T 50/673 (2013.01)

(58) Field of Classification Search
  CPC ........ F04D 29/324; F01D 5/147; F01D 5/288; B64C 11/205; Y02T 50/673; Y02T 50/672; F05D 2220/36; F05D 2240/303
  See application file for complete search history.

(56) References Cited

U.S. PATENT DOCUMENTS

| | | |
|---|---|---|
| 2002/0174940 A1 | 11/2002 | Nitowski |
| 2006/0016690 A1 | 1/2006 | Ostrovsky |
| 2011/0194941 A1 | 8/2011 | Parkin et al. |
| 2011/0229338 A1* | 9/2011 | Voong .................. F04D 29/023 416/241 B |
| 2012/0152893 A1 | 6/2012 | Parkos et al. |
| 2013/0058791 A1* | 3/2013 | Luo ........................ C25D 7/008 416/241 R |
| 2014/0010663 A1* | 1/2014 | Parkos, Jr. .............. F01D 5/147 416/241 R |

OTHER PUBLICATIONS

English Translation of Notice on the First Office Action of Chinese Application No. 201580010477.0, dated Feb. 5, 2018 (8 pages).
International Search Report in corresponding International Application No. PCT/FR2015/050439 dated Jun. 26, 2015 (3 pages).
English Translation of Notice on the Second Office Action of Chinese Application No. 201580010477.0, dated Jan. 3, 2019 (9 pages).
Guangrui Gao et al., "Structure and Infrared Emissivity Properties of the MAO Coatings Formed on TC4 Alloys in $K_2ZrF_6$-Based Solution," *Materials (Basel)*, vol. 11, No. 2, Feb. 7, 2018 (11 pages).

* cited by examiner

PROTECTIVE EDGE FOR A BLADE AND METHOD OF MANUFACTURING SAID EDGE

CROSS-REFERENCE TO RELATED APPLICATIONS

This application is the U.S. national phase entry under 35 U.S.C. § 371 of International Application No. PCT/FR2015/050439, filed on Feb. 24, 2015, which claims priority to French Patent Application No. 1451482, filed on Feb. 25, 2014.

FIELD OF THE INVENTION

The invention relates to a protective edge for a blade and a method for manufacturing said edge. The protective edge may be, in particular, a protective edge for a turbine engine blade.

BACKGROUND OF THE INVENTION

In the field of aeronautics, and more particularly in the field of airplane turbojet engines, decreasing the mass of the component elements of the turbojet engine is a constant concern. This concern has led to the development of fan or rectifier blades made of a composite material with an organic matrix, these composite blades being lighter than metal blades.

The leading edge of composite blades is generally too sensitive to erosion and possible impacts (birds, grit, ice, sand, etc.) to be used without protection. It is therefore common to use a protective edge, made of metal or plastic, glued on the body of the blade. This protective edge then defines the leading edge of the blade. For example, patent document WO2013021141 describes such a protective edge.

The adherence of the protective edge on the body of the blade is an essential aspect. To improve this adherence, according to one known method, a certain number of intermediate layers are deposited, e.g., a polyurethane film or an adhesion primer, between the body and the reinforcing edge of the blade. According to another method, the surfaces to be glued are prepared mechanically, for example by sanding or scratching. Although satisfactory, these methods are deemed too time-consuming, complex and/or expensive to manufacture. Furthermore, the aforementioned intermediate layers may contain certain substances considered to be harmful for the environment, and that are in the process of being phased out by international institutions (such as the REACH system in Europe).

There therefore exists a need for a new type of protective edge that effectively protects the blade while being easy to secure on the body thereof.

BRIEF DESCRIPTION OF THE INVENTION

The invention relates to a method of manufacturing a protective edge for a blade, wherein a protective edge made of an anodizable metal is provided, and that protective edge undergoes a micro-arc oxidation electrolytic treatment.

Micro-arc oxidation electrolytic treatment is a surface treatment technique, known in itself, that consists of submerging a substrate in an electrolytic bath and anodizing that substrate with a high voltage in order to reach the breakdown voltage of the layer of insulating oxide which is initially formed on the surface of the substrate in the first moments of the treatment. Micro-arcs are then initiated and move over the immersed surface of the substrate. This technique allows to create a coating on the surface of the substrate having a specific structure and specific physicochemical properties through the formation of an oxide layer which is made up of the component elements of the substrate, on the one hand, and the incorporation in the oxide layer of chemical species which are initially present in the electrolyte bath, on the other hand. At the end of the treatment, the obtained coating has a dense and hard structure in its core and a porous structure on its surface. This technique is also referred to in the literature as "micro-arc plasma oxidation treatment", or more simply "micro-arc oxidation treatment".

Micro-arc oxidation is very different from the traditional anodization methods. It in particular differs from those methods by the large quantity of energy involved, which is necessary to reach the breakdown voltage of the oxide layer.

The production of a surface coating by micro-arc oxidation leads to the formation of a specific coating, having a specific micro-structure quite different from that of a coating obtained by traditional anodization.

Micro-arc oxidation does not require an input of metal to form the coating. The formed coating is obtained by oxidation of the metal (or metal species) present on the surface of the substrate undergoing the micro-arc oxidation treatment.

In the proposed application, the protective edge is used as the substrate and the micro-arc oxidation treatment makes it possible to form, on the surface of the protective edge, a coating which is dense and hard in its core on the one hand, and porous on its surface on the other hand. The hardness of this coating allows effective protection of the blade against erosion or any impacts, while the surface porosity of the coating facilitates and improves the securing of the coating, in particular when it is secured by gluing, by providing good catching for the adhesive used.

The protective edge may in particular be made of titanium, titanium alloy, aluminum or aluminum alloy. When the protective edge is made of titanium or titanium alloy, the coating formed on the protective edge is made up primarily of titanium oxide.

To ensure protection for the blade, the protective edge is configured so that it can be glued on a blade body and thereby form the leading edge or trailing edge of the blade.

In some embodiments, the protective edge has an outer face and an inner face opposed to each other, the outer face partially defining the aerodynamic surface of the blade, and the inner face being configured to be secured on the body of the blade.

During the carrying out of the method according to the invention, the micro-arc oxidation treatment is normally applied on all of the external surfaces of the protective edge, and therefore on both the outer face and the inner face.

However, the requirements in terms of surface properties are different on these two faces of the protective edge of the blade.

On the outer face, the protective edge of the blade must preferably both be very smooth for aerodynamic reasons, and have a large resistance to wear in order to withstand impacts with the particles present in the atmosphere.

The surface coating obtained by micro-arc oxidation generally has a certain roughness. Thus, a priori, such a coating does not seem at all appropriate for a surface having to constitute the leading edge or trailing edge of a blade.

Or, at least, when this coating has the necessary roughness to allow gluing of a part, this roughness then generally tends to make the coating incompatible with aerodynamic requirements, which on the contrary demand that the surface be especially smooth.

Consequently, in one embodiment, advantageously, the outer face of the protective edge is polished after the micro-arc oxidation treatment. This polishing then allows the outer face to achieve a roughness level compliant with a certain level of aerodynamic requirements.

The polishing may in particular be done such that the roughness level of the outer face of the protective edge is less than 2 µm, and preferably less than 0.8 µm.

Furthermore, after polishing, the dense and hard structure of the coating is on the surface. Advantageously, this part of the coating has a particularly high wear resistance.

Conversely, on the inner face of the protective edge, the surface layer of the coating formed by micro-arc oxidation has surface porosity and inner face roughness qualities which are entirely adapted to the gluing of that face on the blade. Consequently, this surface layer may be retained in order to favor the physicochemical adhesion (e.g., the gluing) of the protective edge on the body of the blade. In particular, the inner face may preferably not be polished after the micro-arc oxidation treatment. The composition of the electrolyte bath used during the treatment may also be chosen so that the porous surface of the inner face incorporates specific chemical species favoring the physicochemical adherence.

After the micro-arc oxidation step, optionally followed by a polishing step, the protective edge is glued on a blade body. The protective edge thereby forms the leading edge or trailing edge of the blade.

In certain embodiments, the micro-arc oxidation electrolytic treatment comprises the following steps:
  the protective edge is immersed in an electrolyte bath, the protective edge forming a first electrode,
  a second electrode (also called counter electrode) is immersed in the electrolyte bath, and
  a voltage is applied to the first and second electrodes.

Preferably, when this voltage is applied, a current is imposed. In other words, the micro-arc oxidation operation is controlled, in particular by regulating the intensity of the imposed current.

Preferably, the applied intensity has pulses, in particular when the protective edge is formed of titanium or a titanium alloy. Preferably, the frequency of these pulses is lower than 50 Hertz.

The second electrode may be arranged in the electrolyte bath facing the inner face of the reinforcement, so as to facilitate the treatment of that inner face, which generally has a geometry that is less favorable to the treatment than the outer face. Typically, the inner face of the reinforcement is concave (i.e., hollowed out), while the outer face is convex (i.e., cambered).

The reinforcement may have a substantially U-shaped cross-section so as to be positioned straddling the body of the blade. This reinforcement may have a base which constitutes the thickest part of the protective edge. The outer face of this base may define the leading edge (or the trailing edge) of the blade. This base may be extended by two side flanks respectively situated on the pressure side and the suction side of the blade. The outer faces of these flanks respectively define, in part, the pressure side and suction side faces of the blade. In cross-section, the profile of these flanks may become thinner moving away from the base. The protective edge may be secured on the body of the blade, over all or part of the height thereof.

The invention also relates to a protective edge manufactured using the method described above and a blade comprising such a protective edge. The blade may be a turbomachine blade, in particular an aeronautical turbomachine fan blade (e.g., of an airplane turbojet engine). The blade may also be a propeller blade or vane.

The blade may comprise a body, or central part, made of an organic matrix composite material. The blade may, for example, be a composite blade obtained by draping a woven material. Still as an example, the composite material used may be made up of an assembly of woven carbon/plastic fibers and a resinous matrix (e.g., a matrix of epoxy resin, bismaleimide or cyanate-ester), the assembly being formed by molding, for example using a vacuum resin injection method of the RTM (Resin Transfer Molding) type.

The protective edge may be secured on the central part, in particular by gluing, and may define the leading edge or trailing edge of the blade.

The aforementioned features and advantages of the invention, as well as others, will appear upon reading the following detailed description of embodiment(s) of the invention. This detailed description refers to the appended drawings.

BRIEF DESCRIPTION OF THE DRAWINGS

The appended drawings are schematic and are not to scale; their primary purpose is to illustrate the principles of the invention.

In these drawings, from one figure (FIG) to another, similar elements (or parts of elements) are identified using the same reference signs.

DETAILED DESCRIPTION OF THE INVENTION

Figure 1:
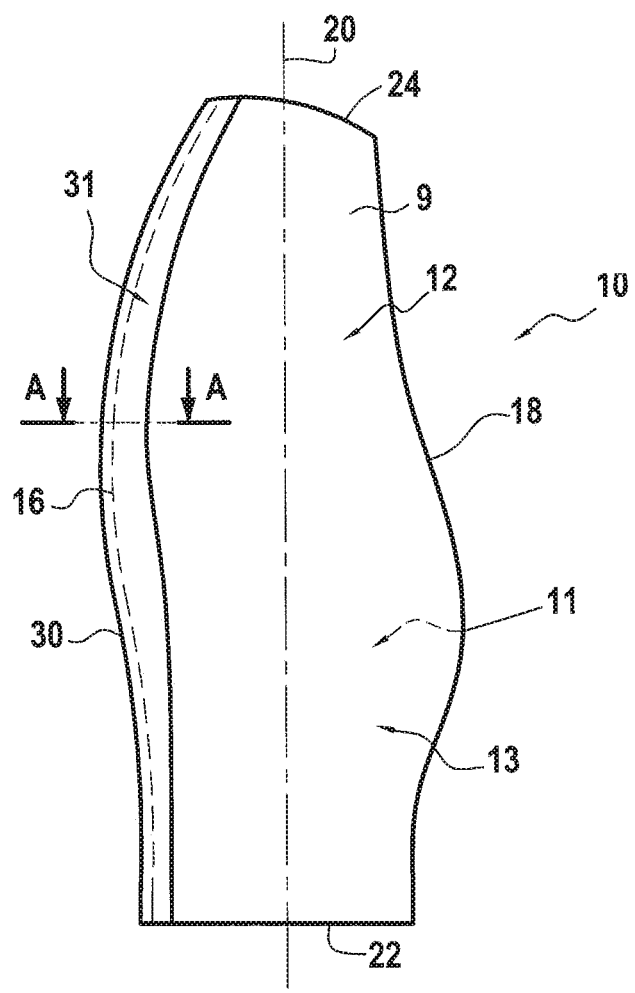
FIG. 1 is a side view of a blade comprising a protective edge.
Figure 2:
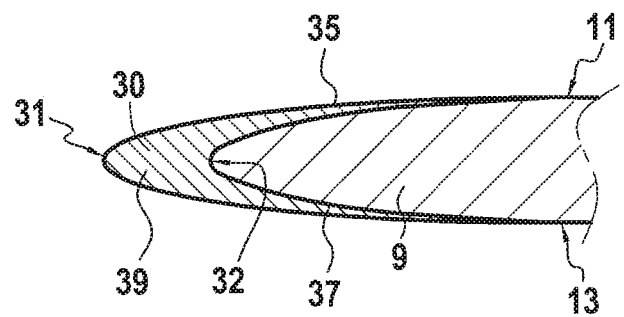
FIG. 2 is a partial view of the blade of FIG. 1, in sectional view along cross-sectional cutting plane A-A.

FIGS. 1 and 2 show a turbomachine engine blade 10. The blade may be a fan blade of an airplane turbojet engine. This blade 10 is intended to be situated in the stream of fluid flowing through the turbojet engine. Upstream and downstream are defined relative to the normal flow direction of this fluid.

The aerodynamic surface 12 of the blade extends, from upstream to downstream, between a leading edge 16 and a trailing edge 18, and along a longitudinal direction 20 between a shank 22 and an apex 24. The blade 10 is secured by its shank 22 to a rotating support disc, which is shared by several blades.

The suction 13 and pressure 11 faces are the side faces of the aerodynamic surface 12 of the blade that connect the leading edge 16 to the trailing edge 18.

The blade 10 comprises a body 9 on which a protective edge 30 is secured by gluing. This protective edge 30 extends over the entire height of the aerodynamic surface 12 of the blade 10, along the longitudinal direction 20. The protective edge 30 has an outer face 31 and an inner face 32 which are opposed to each other. The outer face 31 of the protective edge 30 defines the leading edge 16 and part of the suction 13 and pressure 11 faces. The rest of the suction 13 and pressure 11 faces and the trailing edge 18 are defined by the body of the blade 9. The inner face 32 of the protective edge 30 is in contact with the body 9.

The protective edge 30 has a substantially U-shaped section and is positioned straddling the edge of the body 9. This reinforcement has a base 39 that is the thickest zone of the reinforcement and that defines the leading edge 16. This base 39 is extended by two side flanks 35 and 37 respectively situated on the pressure surface side and the suction surface side of the blade 10. The flanks 35, 37 have, in cross-section (see FIG. 2), a profile that becomes thinner going toward the trailing edge 18.

Figure 3:
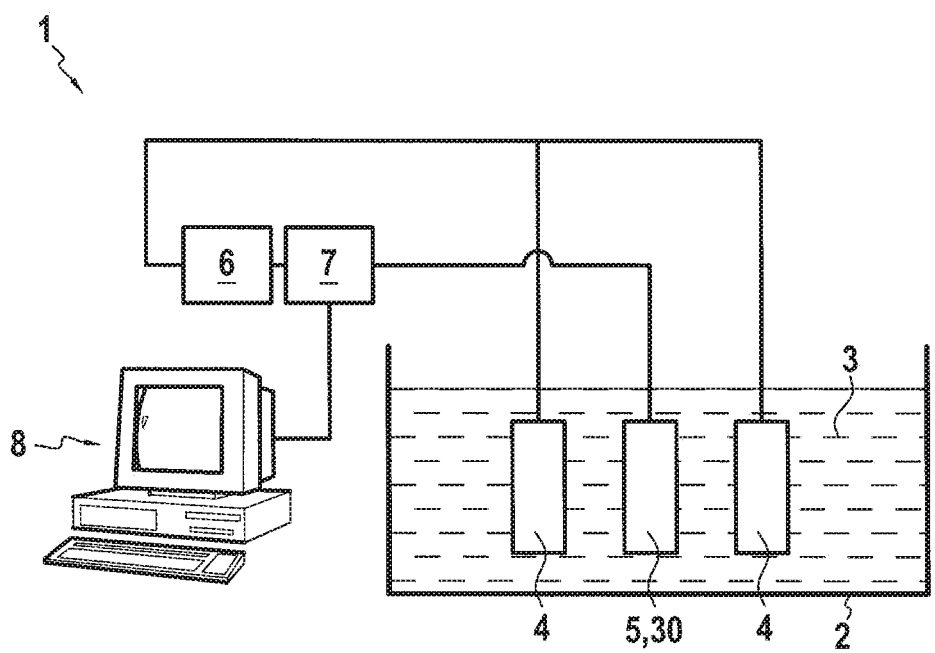
FIG. 3 is a general view of a micro-arc oxidation electrolytic treatment installation.

FIG. 3 schematically shows an example of a micro-arc oxidation electrolytic treatment installation 1. This installation comprises a tank 2 containing an electrolytic bath 3 or electrolyte. For example, this electrolytic bath is made up of an aqueous solution of a hydroxide of an alkali metal (e.g., potassium or sodium) and of an oxyacid salt of an alkali metal. A substrate 5 forming a first electrode, made of metal or a metal alloy and having semiconductor properties, on the one hand, and at least one second electrode 4, called "counter electrode", on the other hand, are immersed into the electrolytic bath 3. The installation also comprises a current supply source 6, a voltage generator 7 and control means (for example, a microcomputer 8) controlling and monitoring the variable parameters depending on the treatment sequences. The control means 8 in particular allow to regulate the intensity I of the current flowing through the electrolytic bath. This installation allows to form a coating on the substrate 5 by transforming the metal constituting that substrate 5. The general operation and control of such an installation being known from the prior art, they will not be described in further detail here.

In the proposed method, the substrate 5 is formed by the protective edge 30. For example, the protective edge 30 is made of titanium or titanium alloy. The usage ranges of the installation 1 for creating a coating on this protective edge 30 are, for example, the following:

Current density: from 20 to 400 A/dm$^2$;
Voltage: from 200 to 1000 V, more particularly from 400 to 800 V;
Intensity pulse frequency: from 1 to 500 Hz, and preferably from 10 to 500 Hz;
Charge ratio $q_p/q_n$: from 0.4 to 1.8 ($q_p$ being the positive charge and $q_n$ the negative charge that are transmitted);
Treatment duration: from 10 to 90 min;
Temperature of the bath: from 5 to 40° C., and preferably from 10 to 40° C.;
pH of the bath: from 6 to 14;
Conductivity of the bath: from 100 to 1000 mS/m.

The electrolyte bath 3 may comprise demineralized water and a mixture of potassium and/or sodium salts in various forms, such as hydroxides, silicates, aluminates, phosphates, thiosulfates, tungstates, thiocyanates or vanadate, with a composition comprised between 0.1 and 50 g/l.

To facilitate the treatment of the inner face 32 of the protective edge 30, the second electrode or counter-electrode 4 may be positioned facing that inner face 32, and may in particular be positioned between the flanks 35, 37 of the protective edge 30 and/or have a geometry similar to the first electrode 5. In the example of FIG. 3, two counter-electrodes 4 are used and positioned on both sides of the protective edge 30, very close to the latter.

The following measures are taken to increase the effectiveness of the micro-arc oxidation treatment:

On the one hand, ultrasounds are diffused in the electrolytic bath 3 during the application of the treatment.

On the other hand, the intensity applied between the substrate 5 and the electrodes 4 is not a direct intensity, but a variable alternating intensity, having periodic pulses applied at time intervals with a duration T. This duration T is chosen to be greater than 20 ms, for example 30 ms, so that the frequency of the pulses remains below 50 Hz.

Figure 4:
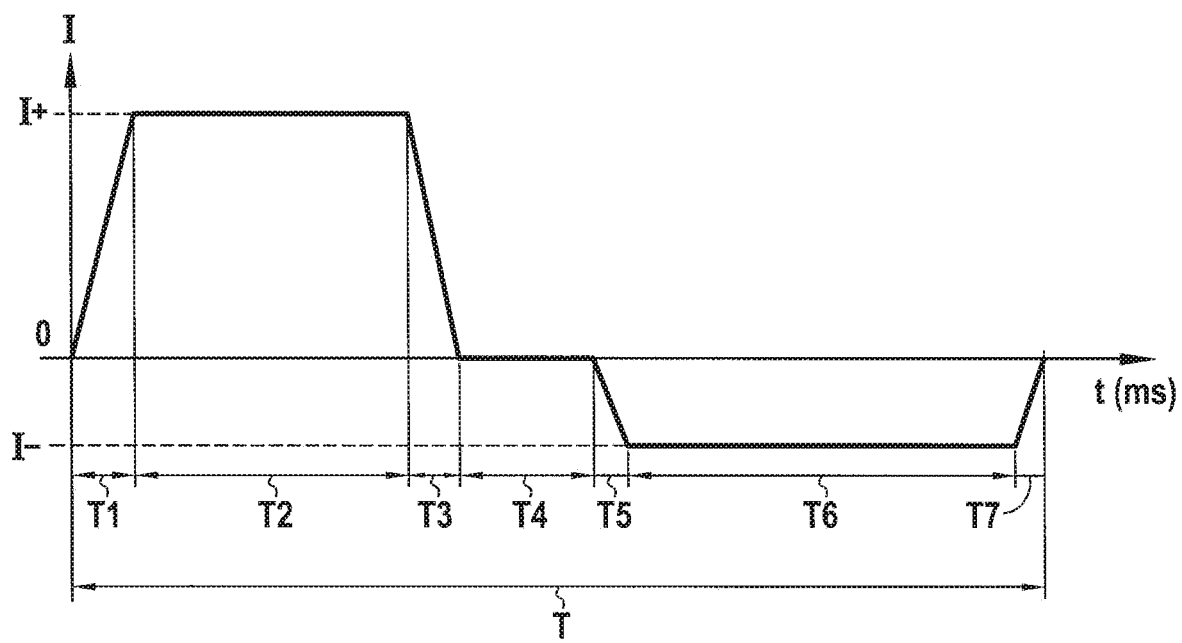
FIG. 4 is a schematic view showing the intensity pulses applied in one embodiment of the invention.

The variations as a function of time t of the intensity I are shown in FIG. 4.

Each pulse is bipolar and includes:
an intensity climb ramp, with duration T1, increasing the intensity from 0 to a positive plateau intensity I+;
a plateau with duration T2 during which the intensity remains equal to I+;
an intensity descent ramp, with duration T3, decreasing the intensity from I+ to 0;
a plateau with duration T4 during which the intensity remains equal to 0;
an intensity descent ramp, with duration T5, decreasing the intensity from 0 to a negative plateau intensity I−;
a plateau with duration T6 during which the intensity remains equal to I−;
an intensity climb ramp, with duration T7, increasing the intensity from I− to 0.

As soon as one pulse is complete, a new pulse is applied.

The intensities I+ and I− of the positive and negative intensity plateaus are not necessarily equal.

The positive and negative plateaus are separated by a short length of time with duration T4 during which the applied intensity is zero.

Figure 5:
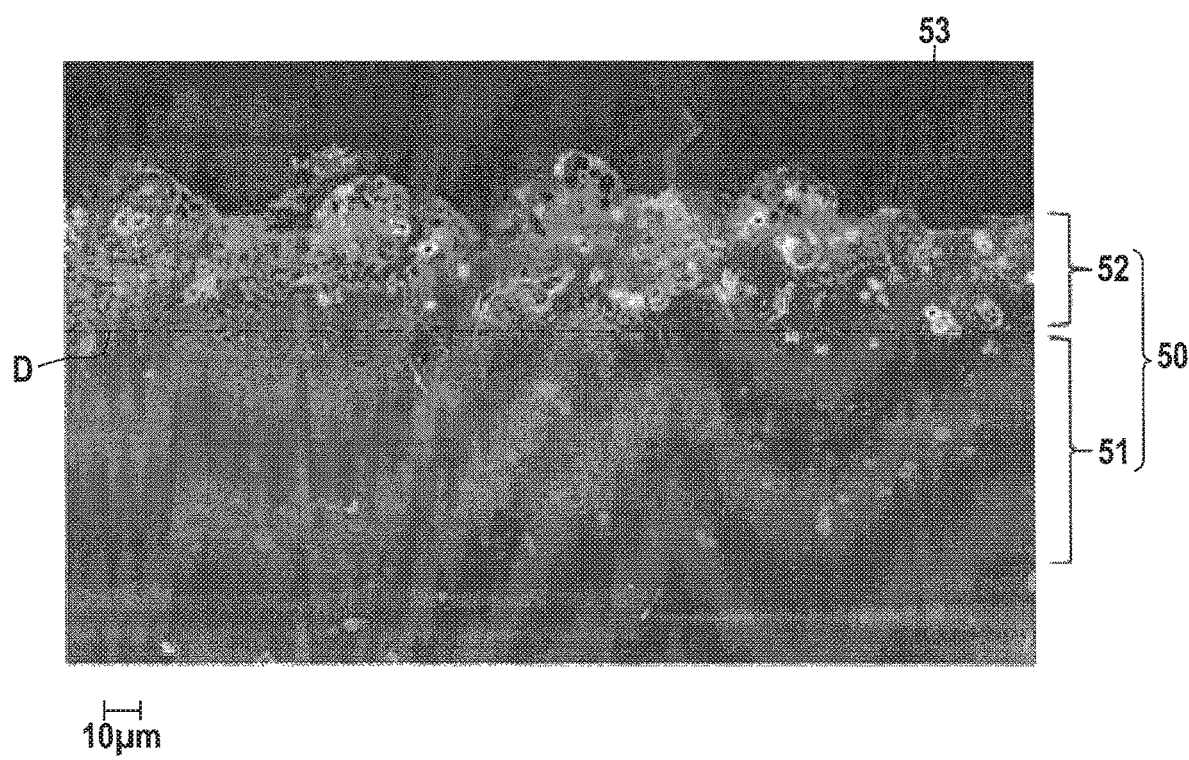
FIG. 5 shows, schematically, in sectional view, the structure of an example coating created using the micro-arc oxidation electrolytic treatment on the substrate.

FIG. 5 shows schematically, in sectional view, the structure of an example coating 50 created using the micro-arc oxidation electrolytic treatment on the substrate 5. In this example, the coating 50 has a porous surface structure 52 and a denser layer 51 situated between the porous layer 52 and the substrate 5. The dense layer 51 is denser and harder than the porous layer 52. As shown, the porous layer 52 has a relatively high porosity and a rough outer surface 53.

After the micro-arc of electrolytic treatment, the outer face 31 of the protective edge 30 may be polished, in particular by tribofinishing or by means of traditional abrasive silicon carbide discs having a particle size decreasing from 80 to 4000 grains per cm$^2$ or equivalent. For example, the desired roughness level for the outer face 31 may be approximately 0.6 microns, which corresponds to a certain level of aerodynamic requirements. This polishing step, in the case of the coating 50 of FIG. 4, amounts to eliminating the porous layer 52, as diagrammed by the dotted line D. The dense layer 51 is thus on the surface and exposed.

The inner face 32 of the protective edge, on the other hand, may remain raw, i.e., not be polished. In the case of the coating 50 of FIG. 4, this amounts to preserving the illustrated multi-layer structure.

Thus, when the protective edge 30 has a coating 50 of the type shown in FIG. 4, the outer face 31 of the protective edge 30 is defined by the outer face of the dense layer 51, defined by the dotted line D, while the inner face 32 of the protective edge 30 is defined by the outer face 53 of the porous layer 52.

The protective layer 30 thus has a hard and smooth outer face 31, improving the protection of the blade 10 and compatible with a certain level of aerodynamic requirements, and a porous and rough inner face 32 promoting the adhesion of the protective edge 30 on the body 9 of the blade 10.

The examples or embodiments described herein are provided purely as an illustration and in a non-limiting manner, a person skilled in the art being easily able, in light of this description, to modify these embodiments or examples, or to consider others, while remaining within the scope of the invention.

Furthermore, the different features of these examples or embodiments can be used alone or combined with one another. When they are combined, these features may be combined as described above or differently, the invention not being limited to the specific combinations described in this description. In particular, unless otherwise specified, a feature described in relation with one embodiment or example may be applied in an analogous manner to another embodiment or example.

The invention claimed is:

1. A method of manufacturing a a blade, comprising:
providing a protective edge made of an anodizable metal, the protective edge having an outer face and an internal face opposed to each other, the outer face being configured to define an aerodynamic surface of the blade, and the internal face being configured to be glued on a body of the blade to form a leading edge of the blade,
performing a micro-arc oxidation electrolytic treatment on the protective edge, applying the treatment to both the inner face and the outer face of the protective edge, forming a coating over the inner face and the outer face, a surface layer of the coating having a surface porosity and a roughness, and
gluing the inner face of the protective edge on the body of the blade body;
retaining the surface porosity and the roughness of the surface layer of the coating over the inner face until the inner face is glued to the body of the blade.

2. The method according to claim 1, wherein the protective edge has an outer face defining in part the aerodynamic surface of the blade, and the method further comprises polishing the outer face after performing the micro-arc oxidation electrolytic treatment.

3. The method according to claim 1, wherein performing the micro-arc oxidation electrolytic treatment comprises the following steps:
immersing the protective edge in an electrolytic bath, the protective edge forming a first electrode,
immersing a second electrode in the electrolytic bath, and applying a voltage to the first and second electrodes.

4. The method according to claim 3, wherein when the voltage is applied, a current is imposed whose intensity has pulses.

5. The method according to claim 3, wherein the second electrode is arranged in the electrolytic bath facing the inner face of the protective edge.

6. The method according to claim 3, wherein when the voltage is applied, a current is imposed whose intensity has pulses.

7. The method according to claim 3, wherein the second electrode is arranged in the electrolytic bath facing the inner face of the protective edge.

8. The method according to claim 1, wherein the protective edge is made of titanium or titanium alloy.

9. A blade manufactured using the method according to claim 1.

10. The blade according to claim 9, wherein the body is made of an organic matrix composite material, the protective edge defining the leading edge or the trailing edge of the blade.

11. The blade according to claim 10, wherein the blade is a fan blade of an aeronautical turbomachine.

12. A turbomachine comprising a blade according to claim 10.

13. The method according to claim 1, wherein the blade body is made of an organic matrix composite material.

14. The method according to claim 1, wherein the protective edge is made of titanium or titanium alloy.

15. A method of manufacturing a blade, comprising:
providing a protective edge made of an anodizable metal, the protective edge having an outer face and an internal face opposed to each other, the outer face being configured to define an aerodynamic surface of the blade, and the internal face being configured to be glued on a body of the blade to form a leading edge of the blade,
performing a micro-arc oxidation electrolytic treatment on the protective edge, applying the treatment to both the inner face and the outer face of the protective edge, a coating over the inner face and the outer face, a surface layer of the coating having a surface porosity and a roughness; and
after performing the micro-arc oxidation electrolytic treatment, polishing the outer face of the protective edge and gluing the inner face of the protective edge on the body of the blade;
retaining the surface porosity and the roughness of the surface layer of the coating over the outer face until the outer face is polished, and
retaining the surface porosity and the roughness of the surface layer of the coating over the inner face until the inner face is glued to the body of the blade.

16. The method according to claim 15, the micro-arc oxidation electrolytic treatment comprises the following steps:
immersing the protective edge in an electrolytic bath, the protective edge forming a first electrode,
immersing a second electrode in the electrolytic bath, and applying a voltage to the first and second electrodes.

17. A blade manufactured using the method according to claim 15.

18. A blade according to claim 17, wherein the blade body is made of an organic matrix composite material.

19. The blade according to claim 18, wherein the blade is a fan blade of an aeronautical turbomachine.

20. A turbomachine comprising a blade according to claim 18.

* * * * *